United States Patent [19]

Fahey

[11] 4,259,190

[45] Mar. 31, 1981

[54] GLASS FIBERS WITH REDUCED TENDENCY TO FORM GUMMING DEPOSITS AND SIZING COMPOSITION

[75] Inventor: Dennis M. Fahey, Lexington, N.C.

[73] Assignee: PPG Industries, Inc., Pittsburgh, Pa.

[21] Appl. No.: 75,069

[22] Filed: Sep. 13, 1979

[51] Int. Cl.$^3$ .......................... B32B 7/00; D03D 3/00
[52] U.S. Cl. ...................................... 252/8.6; 65/3 R; 428/268; 428/378; 428/392
[58] Field of Search ......................... 252/8.6; 428/268; 65/3 R

[56] References Cited

U.S. PATENT DOCUMENTS

| | | | |
|---|---|---|---|
| 3,227,192 | 1/1966 | Griffiths | 65/3 C X |
| 3,615,311 | 10/1971 | Ignatius | 65/3 |
| 3,664,855 | 5/1972 | Morrison et al. | 65/3 |
| 3,869,308 | 3/1975 | Graham | 65/3 |
| 3,928,666 | 12/1975 | Morrison et al. | 65/3 R |
| 4,066,106 | 1/1978 | Graham | 428/268 |
| 4,197,349 | 4/1980 | Walser | 428/378 |

*Primary Examiner*—A. Lionel Clingman
*Attorney, Agent, or Firm*—Kenneth J. Stachel

[57] ABSTRACT

The sizing compositions and sized glass fibers formed therefrom are provided, wherein the sized glass fibers have a reduced tendency to form gumming deposits on fabrication machinery under relatively high humidity conditions, and wherein processibility of the sized glass fibers with the sizing composition is improved, and wherein the sized glass fiber strand package is improved. The sizing composition comprises in weight percent of the non-aqueous ingredients, about 50 to about 75 weight percent of a starch mixture having about 75 to about 95 percent by weight of the mixture comprised of an underivatized, high amylose starch component and about 5 to about 25 weight percent of the mixture comprised of an easily cookable low amylose starch component; and about 5 to about 35 percent of one or more waxes selected from the group consisting of animal waxes, vegetable waxes, mineral waxes, synthetic waxes, and petroleum waxes; and about 9 to about 77 percent by weight of a nonionic lubricant having fatty triglycerides; and about 10 to about 45 percent by weight of an alkyl imidazoline textile softener; and at least 0.1 parts per part of wax and per part of nonionic lubricant of a mixture of sorbitan monostearate and polyoxyethylene sorbitan monostearate wherein one emulsifier has an HLB as low as 4.5 and the other emulsifier has an HLB as high as 15 and wherein the ratio of the emulsifiers are sufficient to give an HLB for the emulsifying mixture between about 8 and about 12. The sizing composition may also contain wetting agents, coupling agents, cationic lubricants, bactericides and the like. The sized glass fibers have the dried residue of the sizing composition on the fibers in an amount of about 0.8 to about 1.5 weight percent based on the weight of the glass.

16 Claims, No Drawings

GLASS FIBERS WITH REDUCED TENDENCY TO FORM GUMMING DEPOSITS AND SIZING COMPOSITION

BACKGROUND OF THE INVENTION

This invention is directed to a sizing composition and sized glass fibers produced therefrom that have a reduced tendency to form gumming deposits.

More particularly, the present invention is directed to a sizing composition and sized glass fibers produced therefrom that have a reduced tendency to form gumming deposits on fabrication machinery at high relative humidities.

Glass fibers in the form of strands are made from a multitude of fine glass fibers which are formed by being drawn at a high rate of speed from molten glass streams flowing from small openings in a bushing. Chemical sizing compositions are applied to the fibers during their formation to protect the fibers from abrading each other when they are gathered together into a strand and when the strand is further processed. Sizing compositions typically contain film-formers or binders, lubricants, coupling agents, and possible other additives like flexibilizing agents, wetting agents, stabilizing agents, plasticizers and emulsifying agents and the like. When the glass fibers are to be used in textile application, for example, in weaving of fabrics, and used as reinforcement for tapes such as carton ceiling tapes and box corner tapes, the sizing composition generally contains one or more starch film-formers or binders and one or more lubricants along with such additives as wetting agents, flexibilizing agents, emulsifiers and the like.

In processing glass fiber strands and producing many of the glass fiber products for textile application the glass fibers in the form of strands must pass through processing machinery such as guide bars and other orientation devices. For example, in the production of glass fiber reinforced tape, the glass fiber strands are oriented by meir bar for proper alignment before coming in contact with the tape material. Manufacturers of glass fiber reinforced material have encountered difficulty in producing the glass fiber reinforcement under high relative humidity conditions. Under these conditions, the current sizing compositions used on glass fibers to protect the fibers, produce sized glass fibers that have a tendency to leave gumming deposits on processing machinery such as guide bars or orientation devices like the meir bar.

These current sizing compositions contain one or more starches or a mixture of starches such as non-crosslinked cationic starches, derivatized starches, high amylose containing starches, low amylose containing starches, hydrolyzed starches such as dextrinized corn starch along with lubricants such as vegetable oil, cationic lubricants, solid and emulsified waxes and the like. In addition, such additives as cationic wetting agents, emulsifying agents, film-formers such as gelatin and polyvinyl alcohol may be added to a starch such as fully or partially dextrinized starch and a lubricant such as hydrogenated vegetable oil. Also, since there is a long drying period during which the wet starch and oil deposit on the glass may act as a base upon which fungus can grow, there is usually included in the sizing composition a small amount of fungicide and possibly a disinfectant. The amount of forming size deposited on the glass fiber is usually about 0.7 to about 2 percent by weight based on the weight of the glass.

The proportions of starch, oil and other additives and types of starch, oil and other additives in the sizing compositions have been varied to suit various requirements.

In U.S. Pat. No. 3,227,192 (Griffiths) a sized glass fabric and method are disclosed wherein the aqueous sizing composition contains as the binder ingredient an amylose containing starch mixture, having a amylose content of about 35 to 45 percent by weight based on the total starch content. The mixture is formed by mixing approximately equal portions of a high amylose starch fraction and a low amylose starch fraction wherein the remainder of the high and low amylose starch fraction is comprised of amylopectin. The high amylose fraction can constitute from about 45 to 55 percent by weight based on a total starch content of the starch mixture while the low amylose content starch fraction constitutes from 45 to 55 percent by weight of the mixture. If the high amylose component is employed in an amount significantly in excess of 55 percent by weight it becomes increasingly difficult to mix (blend) the two starch components especially in an aqueous medium and the viscosity characteristics are deleteriously affected and the burn-off (volatilization) of the binder becomes more difficult and expensive.

In U.S. Pat. No. 3,615,311 (Ignatius) a starch sizing composition is disclosed for coating glass fibers which has greatly improved drying properties. The starch sizing composition has a relatively narrow range of a non-crosslinked cationic starch which is made cationic by attaching a nitrogen or phosphorous with an unshared pair of electrons thereon to a natural starch molecule and an underivatized starch that is preferably high in amylose having a portion of the granules that are incompletely burst.

Also, in U.S. Pat. No. 3,869,308 (Graham) a method of producing an improved sized glass fiber strand suitable for plastisol coating is disclosed. The starch-based sizing composition used to coat the glass fiber strands contains a starch, the salt of a polyamino functional polyamide resin and a carboxylic acid, a wax, and fatty triglyceride. Also, in U.S. Pat. No. 4,066,106 (Graham) a sizing composition for textile glass fibers is disclosed that has a starch, a textile softener, a lubricant and 100 to 150 percent by weight of combined non-ionic wetting agents based on the weight of said lubricant. U.S. Pat. Nos. 3,664,855 and 3,928,666 (Morrison et al) teach the partial cooking of etherified starch or esterified starch, respectively, where the starch has a unique coaction with emulsified particles of solid unctuous materials such as fat, wax, and gelled oil. The sizing composition of Morrison contains in addition to the aforementioned components, a cationic lubricant and emulsifying agent such as an emulsifier for the non-ionic lubricant (alkyl phenoxypolyethyleneoxyethanol) and an emulsifier such as sorbitan monostearate and can also contain a starch diluent and secondary film-former and non-ionic oil.

It was recently suggested in a copending, commonly assigned, patent application to produce a sized glass fiber strand having a reduced tendency to form gumming deposits by using a sizing composition having about 50 to about 65 percent by weight of the sizing composition, based on the non-aqueous components, of a cross-linked starch which has been partially cooked to within about 50 percent of complete cooking along with a salt of a polyamino functional polyamide resin, a wax, and fatty triglyceride. It was found in using this recently developed sizing composition that processing problems of binder cook-out on heating coils, and high binder usage, and soft shouldered forming packages were troublesome.

It is an object of the present invention to provide a sizing composition that yields sized glass fibers having a reduced tendency to form gumming deposits while presenting few, if any, processing problems.

It is an additional object of the invention to provide a sizing composition and sized glass fibers made therefrom, wherein the sized glass fibers have a reduced tendency to form gumming deposits and are produced with the sizing composition while minimizing binder cook-out, high binder usage, or the production of soft shouldered forming packages.

SUMMARY OF THE INVENTION

In accordance with the present invention, it has been discovered that the use of a specific emulsifier system and specific starch mixture assuages the aforementioned processing problems in the production of sized glass fibers having a reduced tendency to form gumming deposits.

The improved sizing composition comprises about 50 to about 75 weight percent of a starch mixture; about 5 to about 35 weight percent of one or more waxes selected from the group consisting of animal waxes, vegetable waxes, mineral waxes, synthetic waxes, polyalkylene waxes, and petroleum waxes; about 9 to about 77 percent by weight of a fatty triglyceride, and at least 0.01 part per part of wax and per part of fatty triglyceride of an emulsifier system.

The starch mixture is an amylose starch mixture having an amylose content of about 35 to 45 percent by weight. The mixture is formed by admixing about 75 to about 95 percent by weight of a high amylose starch fraction, e.g. one containing about 50 to 60 percent by weight of amylose with a greater portion of the remainder being amylopectin, and about 5 to about 25 weight percent of a low amylose starch fraction, e.g., one containing about 20 to 30 percent by weight of amylose with the greater portion of the remainder being amylopectin.

The emulsifier system is a mixture of sorbitan monostearate and polyoxyethylene sorbitan monostearate wherein one emulsifier has a hydrophilelipophile balance (HLB) as low as about 4.5 and the other emulsifier has an HLB as high as about 15, and wherein the ratios of the emulsifiers are sufficient to give an HLB for the mixture between about 8 and about 12. The emulsifier system comprises at least two of the aforementioned types of emulsifying agents.

In addition to the starch mixture, wax, fatty triglyceride, and emulsifier system, other ingredients may be added to the sizing composition. These ingredients include textile softeners, wetting agents, additional lubricants, cationic fungicides, plasticizers, and the like.

The sized glass fibers in any form known to those skilled in the art, such as strands, bundles, roving, woven fibers, and the like, contain the dried residue of the sizing composition which was applied to the fibers in a conventional manner. The sized glass fibers so produced have good performance in fabrication machinery under atmospheric conditions of a high relative humidity, for example, above 60 percent relative humidity.

DETAILED DESCRIPTION OF THE INVENTION

The basic starch components of the amylose-containing starch employed in the starch mixture can be derived from any starch sources including corn, wheat, potato, tapioca, waxy maize, sago, rice, hybrid starches, etc. Conventionally, however, the starch component having the high amylose content, e.g., 50 to 60 percent by weight, is derived from either corn starch or a hybrid corn starch having over 50 percent by weight amylose. The starch component having the low amylose content, e.g., 20 to 30 percent by weight, is usually derived from either potato or derivatized corn starch, such as cationic, phosphatized, ethoxylated or esterified derivatives. The overall amylose content of the starch mixture can vary from about 35 to about 55 percent by weight based on the total starch content.

The high amylose starch component preferably contains around 55 percent by weight of amylose with the remainder being amylopectin. The high amylose component can constitute from about 75 to about 95 percent by weight based on the total starch content of the starch mixture. Preferably, the high amylose component constitutes about 75 to about 85 percent by weight of the starch mixture. The use of the high amylose component in these large amounts gives a starch component that is difficult to mix especially in aqueous media and is also difficult to cook or oxidize.

The low amylose content starch component is a more-easily cookable, starch which preferably contains from about 25 to 27 percent amylose with the remainder being amylopectin. Instead of pure starch, the low amylose content component can, but preferably does not, contain cross-links. Thus, preferably, the low amylose content component is a corn starch with few, if any, cross-links having an amylose content of from about 25 to about 27 percent by weight. The starch components provide the sizing composition with bulk and impart strand integrity to the sized glass fibers, thus diminishing the development of fuzz which can lead to strand breakage. The low amylose content component being of a viscous nature contributes to the non-migratory nature of the sizing composition. The low amylose component constitutes from about 5 to about 25 percent by weight of the mixture based on the total starch component, and preferably, about 10 to about 25 weight percent.

The term "starch mixture" as used herein is intended to be descriptive of the fact that a plurality of different starches, each having different amylose content and ease of cooking are employed in the instant sizing composition and not to preclude the possibility of chemical interaction between the starch molecules of each of the starch components. In fact, some chemical bonding can be present between the molecules of both the high amylose starch and the low amylose starch, and such starch mixtures possessing intermolecular bonding between the starch components are considered to be within the realm of this invention. The starch mixture that has been cooked either by cooking the individual components and adding them together or adding the starch components together then cooking the mixture yields a mixture that contains partially cooked starch because of the fact that one starch component is easily cookable while the other starch component is difficult to cook. The partially cooked starch is predominantly the easily cooked starch, i.e., the low amylose starch component, but some starch from the high amylose starch component may also be cooked. Overall, the partial cooking of the total starch mixture is around 10 to around 30 percent by weight of the starch in the starch mixture. Obtaining a partially cooked starch by use of a starch mixture increases the control in obtaining the partially cooked starch over obtaining the partially cooked starch by the use of a cookable starch that is partially cooked by the conditions of cooking.

Also considered to be included within this invention are starch mixtures wherein the low amylose component and the high amylose component are lightly crossbonded to provide a weak knit yielding a three dimensional composite starch network which is water soluble or water dispersible.

Examples of commercial starches that can be used as the high amylose starch component and the low amylose starch component include for the high amylose starch component the starch designated "Hylon", available from National Starch, and the starch designated "Miraquik", available from A. E. Staley Manufacturing Company. An example of the commercially available low amylose starch component is "Amaizo 310", available from American Maize Products Company and "National HFS", "Nabond", "1554", all available from National Starch, and Ethylex 2065 available from A. E. Staley Manufacturing Co.

The wax component of the sizing composition of this invention can be any suitable wax selected from the group consisting of vegetable waxes, such as carnauba, Japan, bayberry, candelilla and the like; animal waxes such as bees wax, Chinese wax, hydrogenated sperm oil wax and the like; mineral waxes such as ozocerite, montan, ceresin and the like; and synthetic waxes such as polyalkylenes like polyethylenes, polyethylene glycols, polyethylene esters, chloronaphthalenes, sorbitals, polychlorotrifluoroethylenes; petroleum waxes such as paraffin, microcrystalline waxes and the like. The wax acts as an external lubricant for the glass fibers allowing the glass fibers to endure the abrasion caused by the apparatus employed for the forming, gathering, twisting and further processing without breaking or fuzzing. Any amount of the wax known to those skilled in the art of sizing glass fibers can be used.

The lubricants which are found to be useful in the practice of the present invention are typically vegetable oils which have been hydrogenated. A typical vegetable oil would be hydrogenated cotton seed oil, hydrogenated corn oil, hydrogenated soybean oil, hydrogenated fatty triglyceride, such as glycerol tristearate, hydrogenated glycerol trioleate, and the like. Any amount of lubricant known to those skilled in the art of sizing glass fibers can be used.

It is preferred to use a specific amount of wax in conjunction with a specific amount of lubricant. Ratios of wax to lubricant may vary somewhat depending on the specific wax or specific lubricant used. When the wax is paraffin wax and the lubricant is soybean oil, the ratio of wax to oil is in the range of about 1:4 to about 4:1.

Textile softeners are employed in the sizing composition in amounts which are sufficient to provide softening action to the sized glass fibers. Such amount being, for example, about 4 to about 15 percent by weight of said amylose-containing starch derivatives and, preferably, about 10 percent by weight of said amylose-containing starch derivatives. Typical textile softeners are alkyl imidazoline derivatives such as those described in U.S. Pat. Nos. 2,200,815; 2,267,965; 2,268,273; and 2,355,837, which are incorporated herein by reference. The material designated "Cation X ®" is an example of such a material wherein the alkyl imidazoline derivative is the reaction product of stearic acid, tetraethylene pentamine and acetic acid. Acid solubilized water dispersible stearic amides and anhydrous acid solubilized water dispersible lower molecular weight fatty acid amides as well as anhydrous acid solubilized polyunsaturated lower molecular weight fatty acid amides can also be used as a softener.

The emulsifier system of the sizing composition of the present invention is important since acceptable stability of the emulsion sizing composition must be obtained. This is a problem because of the use of the saturated fatty triglyceride type lubricant in conjunction with the wax component and the starch mixture. The fatty lubricant and the wax are substantially diverse in chemical structure and the emulsifiers used to emulsify the wax are different from those used to emulsify the fatty acid ester lubricant. Destabilization might occur when the fatty ester lubricant or saturated fatty triglyceride type lubricant is added to an emulsion containing the wax and starch mixture. Thus, the emulsifying system used in the sizing composition of the present invention is of significant importance. A dual emulsifying system is utilized wherein one emulsifier is a sorbitan monostearate and the other emulsifier is polyoxyethylene sorbitan monostearate wherein one emulsifier has an HLB as low as about 4.5 and the other emulsifier has an HLB as high as about 15. The amounts of the two emulsifiers used in a sizing composition are those amounts sufficient to give an HLB for the emulsifying system of between about 8 and about 12.

Particularly suitable emulsifiers for the sizing composition of the present invention have been found to be the sorbitan monostearate available as "AHCO-909" with an HLB of 4.7 and "AHCO-DFS-149", a polyoxyethylene (20) sorbitan monostearate with an HLB of 14.9. Both of these products are available from ICI Americas, Inc. The amount of the emulsifiers used in the sizing composition should be at least 0.1 part per part of wax and per part of oil-type lubricant. Although it is preferred that the emulsifier system is comprised of two emulsifiers as those mentioned above, it is within the scope of the sizing composition of the present invention to have an emulsifier system with more than two emulsifiers so long as the emulsifier system has a HLB in the range of about 8 to about 12 and preferably in the range of about 8 to about 10.5. The HLB is an expression of the relative simultaneous attraction of an emulsifier for water and for oil or for the two phases of the oil-in-water emulsion system being considered. It would appear to be determined by the chemical composition and extent of ionization of a given emulsifier.

In addition to the starch mixture, wax, oil-type lubricant, textile softener, and emulsifier system, other ingredients may be added to the sizing composition of the present invention. Such ingredients include wetting agents like nonionic wetting agents, cationic wetting agents, and the like. Cationic agents which can be included in the sizing composition are acetyl or stearyl monoamine hydrochloride or acetate, decylamine, hexadecylamine and secondary and tertiary derivatives of the same, for example, dodecyl methylamine and salts thereof. Quaternary ammonium compounds such as trimethyl stearyl ammonium bromides and chlorides and generally any of the amine compounds which dissociate in aqueous solution to provide a positive radical containing a group of more than 10, preferably 12 or more, carbon atoms, can be employed. These materials are cationic active substances.

A fungicide such as one of the metal-organo quaternary-type, for example, tributyl tin oxide, can be employed in sufficient amounts to prevent mold attack on the amylose containing starch derivatives. Suitable effective amounts of a fungicide are about 3 milliliters to 75 gallons of the sizing composition.

Plasticizers can be employed in the sizing composition to lessen the brittleness of the strands of glass fibers and to improve the end finding of the strands. The product known as "Carbowax ® 300" is a polyethylene glycol with an average molecular weight of 300, and may be used as a plasticizer in the sizing composition of the present invention. Further, polyethylene glycol is believed to impart even tension properties to the sized glass fibers. If desired, polyethylene glycol can be employed in conjunction with a water soluble polyvinyl alcohol in the size. This is often desirable because of the added film strength properties which sizing compositions containing this combination impart. The ratio of polyvinyl alcohol to the polyethylene glycol when used in combination ranges from about 1:1 to about 2:1. The combined amount of polyethylene glycol and polyvinyl alcohol in the sizing composition is about 0.1 to about 0.2 percent by weight of the amylose containing starch component. In place of the low molecular weight polyethylene glycol, glycerine can be employed in similar weight concentration. The glycerine can be used either alone or in a mixture with polyvinyl alcohol.

Typically, the overall solids content of the sizing composition can vary from about 4 to about 12 percent by weight. It should be noted that the solids content can be adjusted in accordance with the desired solids content for the specific forming conditions employed. Preferably the solids content will range from about 5 to 7 percent by weight and most preferably from around 5.8 to less than 6.5 percent by weight. By solids content it is meant the residual solids remaining after drying the sizing composition at 105° C. to constant weight.

In addition to the aforementioned primary ingredients of the sizing compositions of the present invention, coupling agents can also be used in the sizing composition. Such coupling agents function to enable the glass fibers to adhere to the starch coating which will be applied to strands, thus imparting improved moisture-resistance to the finished product. Coupling agents which may be used in aqueous sizing compositions in the practice of the present invention include silane and siloxane materials. For example, hydrolyzable vinyl, allyl, beta-chloropropyl, phenyl, thio-alkyl, thio-alkaryl, amino-alkyl, methacrylato, epoxy and mercapto silanes and their hydrolysis products and polymers of the hydrolysis products and mixtures of any of these are suitable for such use. Another class of coupling agents which may be used in the sizing composition of the present invention are the basic (hydroxy-containing) metal salts of a strong mineral acid such as, for example, a basic chromium chloride, basic chromium sulphate. Another type of coupling agent which can be used in the sizing composition of the present invention is a complex compound of the Werner type in which a trivalent nuclear atom such as chromium, is coordinated with an organic acid such as methacrylic acid.

In addition, if desired, other known glass fiber lubricants can be added to the sizing composition of the present invention. For example, a polyamino salt, which when used in conjunction with the starch provides internal lubricity to the glass fibers in the form of a strand and internal integrity to allow the strand to be uniformly coated with starch containing materials, can be used in the sizing composition of the present invention. The salt of the polyamino-functional polyamide resin and carboxylic acid is formed by the addition of said carboxylic acid to said polyamino-functional polyamide resin. The polyamino-functional polyamide resin can be any such resin but preferably is one which has an amino value between 100 and 400. These resins are formed normally by the condensation reaction of a polycarboxylic acid such as a dimerized or trimerized fatty acid and a polyamine such as tetraethylene pentamine, ethylene triamine, diethylene triamine, diethylene tetramine, and the like. The carboxylic acid constituent of the aforementioned salt is chosen from the group of organic carboxylic acids having 1 to 5 carbon atoms, such as formic acid, acetic acid, acrylic acid, methacrylic acid, butyric acid, chloroacetic, and pentanoic acid, or the like.

Preparation of the Aqueous Sizing Composition

The aqueous sizing composition suitable for use as a sizing composition to yield sized glass fiber strands in accordance with the present invention are conveniently prepared in the following manner. The individual starch components, e.g., the high amylose underivatized starch component and a low amylose starch component are added to water which has previously been placed in a mixing tank. Preferably, a high amylose content starch is added first with agitation followed by the addition of the low amylose content starch component. The agitation is continued at an elevated temperature until substantially all the lumps of the starch are in a suspension. The starch mixture is then heated (cooked) at a temperature and pressure sufficient to allow the starch mixture to enter into a suspension. Generally, the temperature is from about 190° F. (88° C.) to 260° F. (127° C.) and more preferably from about 200° F. (94° C.) to 240° F. (116° C.) in a pressure cooker, e.g., of the Jet, Auger or Batch type, at a pressure of from about 5 to about 40 psi (gauge) (0.35 to 2.8 kg/cm$^2$) for a sufficient period of time to allow the components to go into suspension, e.g., for jet cooking a period of about 0.5 to 12 lbs/minute (6 kg/min) of starch in slurry form, depending on the size of the jet cooker. Any cooker known to those skilled in the art of cooking starch can be used at suitable conditions to yield the degree of cooking similar to that obtained with the jet cooker. In a separate mixing vessel the wax is added and melted. After the wax is melted and at a temperature of around at least 66° C., the lubricant (oil) and emulsifiers, as an emulsifying system, are added. With agitation, hot water approximately (80° C.) is added slowly until inversion to oil-in-water emulsion occurs. Then some additional water is added, which is around one half that needed for inversion.

This emulsion is added to the cooked starch mixture. Then to this mixture, there is added any coupling agent in hydrolyzed or unhydrolyzed state, nonionic lubricant, and textile softener. The sizing composition produced is diluted with water to any desired volume.

The aforedescribed preparation of the aqueous sizing compositions can be varied to such an extent that the oil-in-water emulsion is formed in the presence of other additives, or other additives are added to the cooked starch before the emulsion or simultaneously with the emulsion. For the film-forming material having plasticizing properties, materials such as polyvinyl alcohol, polyethylene glycol, can be added to the cooked starch mixture. Then a textile softening material previously dispersed in water can be added to the sizing batch and the formed aqueous system is agitated. In addition, the wetting agent, such as an ethylene oxide derivative or sorbitol ester, can be added to the emulsified wax lubricant by adding the wetting agent to the nonionic or processing oil lubricant then adding the melted wax maintained at a temperature from about 140° to 180° F. which contains the emulsifying system and mixing emulsion mixture. The remaining amount of water is added to bring the aqueous sizing composition up to its desired volume.

PREFERRED EMBODIMENT

In the preferred embodiment, the sizing composition has in addition to the starch mixture, wax, nonionic lubricant, textile softener, and emulsifying system, such ingredients as a wetting agent and cationic lubricant, fungicide, and coupling agent. The amounts of these ingredients are generally in weight percentage based on the non-aqueous sizing composition about 50 percent to about 75 percent by weight of the starch mixture; 4 percent to about 52 percent by weight of a cationic lubricant that is the salt of a polyamino-functional polyamide resin, wherein said polyamino-functional polyamide resin salt is formed from the condensation reaction product of a polycarboxylic acid or carboxylic acid, and a polyamine, where the polyamine has greater than two amine groups per molecule, and where said carboxylic acid has one to five carbon atoms; and 5 to 25 percent by weight of the wax, and 9 percent to 77 percent by weight of the nonionic lubricant which is preferably a hydrogenated soybean oil. Also, the sizing composition preferably contains about 10 to 45 percent of an alkyl imidazoline as the textile softener. The amount of the emulsifying system which is preferably sorbitan monostearate with an HLB of 4.7 and a polyoxyethylene (20) sorbitan monostearate with an HLB of 14.9 in an amount of about 1.5 to about 3 weight percent. The amount of coupling agent used, which is preferably gamma-methacryloxypropyltrimethoxysilane in a hydrolyzed state, is in the range of about 0.5 to about 2.0 weight percent of the aqueous sizing composition or about 1.5 to 20 weight percent of the non-aqueous component of the sizing composition.

The preferred sizing composition is prepared by combining the starch mixture that has been cooked to allow the starch mixture to form a suspension in water along with an emulsion of the wax, nonionic lubricant, emulsifying system, and then adding the additional ingredients of cationic lubricant, wetting agent, coupling agent, textile softener and bactericide to the sizing composition in amounts commonly used in the art.

The sizing composition of the present invention is preferably applied to the glass fibers from an applicator during the formation of the glass fibers. The fibers are gathered into strands by means of a gathering shoe and wound on a rotating drum-type winder onto a forming tube. The collet on which the forming tube is located is rotating at about 4,420 revolutions per minute and the spiral directing the strand onto the forming package is generally operated around 2,300 revolutions per minute. The applicator is generally a rotating belt-type applicator generally rotating at about 133 revolutions per minute. After the winding of the forming package is completed, the package may be placed in an oven for drying, and the package or plurality of packages are dried at a temperature of about 105° C. to produce sized glass fiber strands having the residue of the sizing composition on the glass fibers or it may be twisted directly. The dried residue of the sizing composition is generally disposed on the glass fibers in an amount from about 0.8 percent to about 2.5 percent by weight of the glass.

To further illustrate the sizing composition in the sized glass fibers of the present invention, reference should be made to the following example.

EXAMPLE I

A fiber sizing composition having the following ingredients was prepared:

| Ingredient | Amount in Grams per 11 Gallons (41.635 Grams) | Weight Percent of Non-aqueous Sizing Composition |
|---|---|---|
| Underivatized high amylose starch component (Hylon) | 1,333 | 48.1 (% of starch mixtured- 83.33) |
| Low amylose starch cmponent (Amaizo 310) | 267 | 9.6 (% of starch mixtured- 6.7) |
| Paraffin | 327 | 11.8 |
| Nonionic lubricant (Soybean oil) | 327 | 11.8 |
| Emulsifying agent (Sorbitan monostearate HLB 4.7) AHCO-909 | 24 | 0.87 |
| Emulsifying agent polyoxyethylene (20) sorbitan monostearate HLB 14.9 (AHCO-DFS-149) | 24 | 0.87 |
| Alkyl imidazoline textile softening agent (Cation X) | 218.2 | 7.9 |
| Wetting agent octyl phenoxy poly-(ethyleneoxy)ethanol-wetting agent (Igepal CA-630) | 5.0 ml | — |
| Organo-tin bacteriocide (biomet 66) | .68 | — |
| Coupling agent (gamma-methacryloxy-propyltrimethoxysilane) (A-174) | 50 | 1.8 |
| Acetic acid | 2.5 ml | |
| Cationic lubricant (Versamid 140 available from General Mills Chemical Corporation) | 200 | 7.2 |
| Acetic acid | 50 ml | |

The percent solids of the sizing composition was 6.04 and the pH was 5.82.

The aqueous sizing composition was prepared by adding cold di-ionized water to a mixing tank employing about 1.25 gallons (9.5 liters/kg) of water for each pound of starch. Then adding both starch components to the cold water with mechanical agitation adding the underivatized high amylose starch component first and agitating until most of this component has been added to the water and then adding the lower amylose starch component to the cold water with continued agitation. The starch slurry was pumped through a jet cooker at a temperature in the range of around 235° F. (113° C.) at a sufficient rate to allow the starch mixture to go into suspension. In a separate mixing vessel, the emulsifying agent sorbitan monostearate and polyoxyethylene (20) sorbitan monostearate were added to the molten paraffin wax and the nonionic lubricant at a temperature of about 170° to 180° F. (80° C.) and these materials were mixed in an Eppenbach homogenizer while water at 170°-180° F. (80° C.) was slowly added until the mixture passed through its inversion point and became an emulsified mixture of oil-in-water. This homogenized mixture was then added to the starch mixture along with the addition of "Cation X" (textile softener) which was previously mixed with hot water. Also, there was added an amount of gamma-methylacryloxypropyltrimethoxysilane that had been hydrolyzed with about 2.5 milliliters of acetic acid in water solution. The Biomet 66 and the octyl phenoxy(ethyleneoxy)ethanol mixture were dispersed in water and added to the mixture of starch and emulsion, Cation X and coupling agent. The cationic lubricant "Versamid 140" material was reacted with 50 milliliters of acetic acid and water solution to form a salt which was then added to the mixture containing the starch, emulsion, Cation X and other ingredients. The sizing composition was completed by diluting the mixture to the total volume of 11 gallons. During the entire procedure for combining the above ingredients, agitation is employed to effect a homogeneous suspension.

The sizing composition was used to treat G-150 1/0 glass fiber strands in a conventional manner. The sizing composition was applied to the fibers prior to the time they were gathered together to form a strand containing 150 fibers by means of a roller applicator which is partially submerged in the sizing solution contained in a reservoir. Such an applicator is shown in more detail in U.S. Pat. No. 2,728,972, hereby incorporated by reference. The fibers were gathered into strands by a gathering shoe and wound onto a forming package rotating approximately at 4,420 rpm to produce a strand travel speed of approximately 14,000 feet per minute. Other methods of applying the sizing composition of the strands of glass fibers, such as a pad applicator, may be employed and a strand may be formed by means other than winding on the forming tube, such as by means of a pair of rotating wheel pullers which direct fibers into a suitable collecting device.

The glass fiber strands wound on the forming package were then unwound onto a bobbin by mounting the forming package on a twist frame and removing the strand from the forming package and placing it on a bobbin. During the unwinding and rewinding step, a twist is imparted into the strand which provides integrity for subsequent processing.

The percent LOI of the air-dried, twisted sized glass fibers was about 1.15. These fiber strands were tested at a relative humidity of around 79 percent and at a temperature of 84° F. The testing was performed by using a meir bar between the beam or bobbins of glass fiber strands and the size box of a slashing unit and enclosing the area with a plastic tent in which the humidity could be maintained at some relatively high level. In addition, tensioning rolls were placed before the meir bar. The run speed during the evaluation was 100 to 125 yards per minute and 5,000 yards of glass fiber strand were removed during evaluation with no problem. During this microwarping evaluation, the tensioning post had no build-up of material and the front comb had only moderate shedding and trace lint. The meir bar had no build-up and the back comb had only a trace of shedding, while the eyelets had only a trace of lint. Therefore, the forming package, which had excellent shoulders with no soft shoulder problem and the good processibility of the sized glass fibers, maintained good performance under high humidity conditions by reducing the amount of gumming deposits on fabrication machinery.

The foregoing has described an improved sizing composition and sized glass fiber strand made therefrom wherein the sizing composition has in weight percent based on the non-aqueous components of the sizing composition about 50 to about 75 weight percent of a starch mixture that is quick gelling and comprised of an underivatized, high amylose starch component and a cookable low amylose starch component in a range of about 75 percent to 95 percent of the former and about 5 to about 25 percent of the latter, and a wax, and a nonionic lubricant, and an emulsifying system comprised of a sorbitan monostearate and a polyoxyethylene sorbitan monostearate wherein one emulsifier has an HLB of around 4.5 and the other emulsifying agent as an HLB of around 15, and a textile softening agent. In addition, other ingredients can be added to the sizing composition, such as cationic lubricant, coupling agent, and bacteriocides, along with additional film formers, plasticizers, wetting agents and other types of lubricants and the like. The sized glass fiber strands have deposited on the glass fibers an amount to about 0.80 percent to about 2.5 percent by weight of the glass the dried residue of the aqueous sizing composition.

I claim:

1. An aqueous sizing composition for use with glass fibers to produce sized glass fibers with improved processibility and improved packaging structure for ease of handling and fabrication that has a reduced tendency to form gumming deposits on fabrication machinery under high relative humidity conditions comprising in weight percent based on the non-aqueous components of the sizing composition:
   (a) about 50 to about 75 percent of a starch mixture comprised of about 75 weight percent to about 95 weight percent of an underivatized, high amylose starch component and about 5 weight percent to about 25 weight percent of an easily cookable, low amylose starch component;
   (b) about 5 to about 35 percent by weight of a wax selected from the group consisting of animal waxes, vegetable waxes, mineral waxes, synthetic waxes and petroleum waxes;
   (c) about 9 to about 77 percent by weight of a nonionic lubricant having fatty triglycerides selected from the group consisting of hydrogenated cotton seed oil, hydrogenated corn oil, hydrogenated soybean oil and hydrogenated vegetable oil;

(d) about 10 to about 45 percent by weight of an alkyl imidazoline textile softener;

(e) at least 0.01 part per part of wax and per part of nonionic lubricant of a mixture of sorbitan monostearate emulsifying agent and polyoxyethylene sorbitan monostearate emulsifying agent wherein one emulsifier has an HLB as low as around 4.5 and the other emulsifying agent has a HLB as high as 15 and wherein the ratios of the emulsifiers are sufficient to give an HLB for the emulsifying mixture between about 8 and about 12.

2. The sizing composition of claim 1 that contains about 1.5 percent to 20 percent by weight of a coupling agent.

3. The sizing composition of claim 2 wherein the coupling agent is gamma-methacryloxypropyltrimethoxysilane.

4. The sizing composition of claim 1 that has from about 4 to about 52 percent by weight of a salt of a polyamino functional polyamide resin wherein said polyamino functional polyamide resin salt is formed from the condensation reaction product of a polycarboxylic acid or carboxylic acid and a polyamine wherein said polyamine has greater than two amine groups per molecule and wherein said carboxylic acid has 1 to 5 carbon atoms.

5. The sizing composition of claim 1 wherein the wax, nonionic lubricant, emulsifying agents, are present in the form of an emulsion.

6. The sizing composition of claim 5 wherein a textile softening agent is present in the emulsion.

7. The sizing composition of claim 1 wherein the starch in the underivatized, high amylose content starch fraction is an underivatized corn starch having an amylose content of about 50 to 60 percent by weight with the remaining starch being amylopectin.

8. The sizing composition of claim 1 wherein the starch of the low amylose containing starch component is selected from potato starch or a hybrid or slightly cross-linked corn starch having an amylose content from 25 to 27 percent by weight with the remaining starch being amylopectin.

9. The sizing composition of claim 1 wherein the sorbitan monostearate has an HLB of 4.7 and the polyoxyethylene sorbitan monostearate is a polyoxyethylene (20) sorbitan monostearate having an HLB of 14.9, and the mixture of both are present in an amount in the range of about 1.5 to about 3 weight percent.

10. The sizing composition of claim 1 wherein a wetting agent is present in an amount of about 0.1 to about 3 weight percent.

11. The sizing composition of claim 9 wherein the wetting agent is octylphenoxypoly-(ethyleneoxy)ethanol.

12. The sizing composition of claim 1 wherein a bactericide is present in an amount sufficient to retard molding and bacterial growth.

13. The sizing composition of claim 11 wherein the bactericide is organo-tin bactericide.

14. The sizing composition of claim 1 wherein polyethyleneglycol is present in an amount sufficient to provide a plasticizing effect for the sizing composition.

15. The sizing composition of claim 1 being present as a dried residue on glass fibers in an amount of 0.80 percent to about 2.5 percent by weight of the glass.

16. The method of preparing a sizing composition for treating glass fibers to produce sized glass fibers with improved processibility of formation of the glass fibers and an improved sized glass fiber strand package wherein the sized glass fibers have a reduced tendency to form gumming deposits on fabrication machinery under high relative humidity conditions, comprising:

(a) cooking a starch mixture comprised of 75 to 95 weight percent of an underivatized high amylose starch component and 5 to 25 percent by weight of an easily cookable low amylose starch component at a temperature and pressure conditions to cause partial cooking to the extent that the starch forms a suspension with water;

(b) adding to the partially cooked starch an emulsion formed by adding sorbitan monostearate and polyoxyethylene sorbitan monostearate, one stearate having an HLB of around 4.5 and the other stearate having an HLB of around 15, and a wax selected from the group consisting of animal wax, vegetable wax, synthetic wax, mineral wax and petroleum wax and a nonionic lubricant having fatty triglycerides selected from the group consisting of hydrogenated vegetable oils and an alkyl imidazoline textile softener, and water at a temperature in the range of about 150° to about 170° F.; and (c) adding other ingredients including coupling agent, wetting agent, cationic lubricant, bactericide, either simultaneously or sequentially.

* * * * *